Nov. 4, 1924.                                                 1,514,077
                       G. W. CARLSON
                     BRAKE CONSTRUCTION
                    Filed Oct. 31, 1922
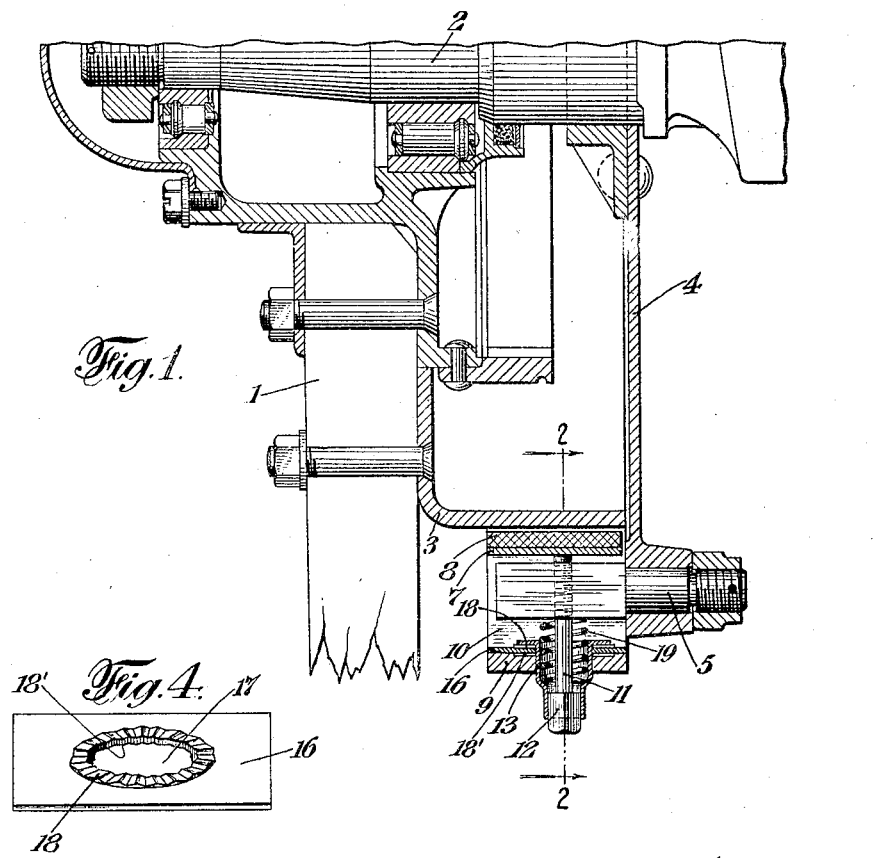
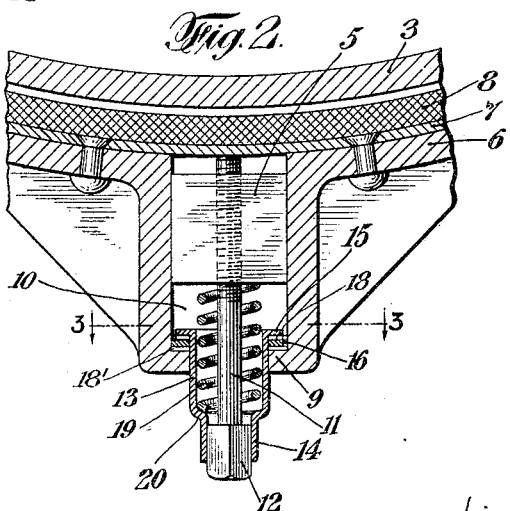
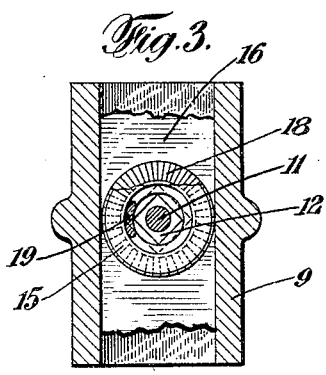
INVENTOR
Gustav. W. Carlson,
BY his ATTORNEYS,
Ward, Crosby and Smith Patented Nov. 4, 1924.

1,514,077

UNITED STATES PATENT OFFICE.

GUSTAV W. CARLSON, OF CLEVELAND, OHIO.

BRAKE CONSTRUCTION.

Application filed October 31, 1922. Serial No. 598,087.

*To all whom it may concern:*

Be it known that I, GUSTAV W. CARLSON, a subject of King Gustav V of Sweden (first citizenship papers taken out in September, 1918), and resident of Cleveland, in the county of Cuyahoga and State of Ohio, have invented certain new and useful Improvements in Brake Constructions, of which the following is a specification.

The invention relates to improvements in brake constructions and particularly to devices for adjusting the position of the brake band with respect to the brake drum to vary the clearance, and means for automatically locking such adjusting means in adjusted position. The present application is a continuation in part of my application Serial No. 549,595, brake construction, filed April 4, 1922.

A brake band adapted to coact with a brake drum is commonly supported at one point, as by an anchor pin from a suitable supporting structure, the brake being tightened into engagement with the drum, when the brake is applied, by suitable means acting on the brake band at a point diametrically opposite from the supporting pin. In such a construction provision should be made for adjusting the part of the brake band which is supported by the anchor pin towards the brake drum, from time to time as such adjustment may be required on account of wear of the brake. In my improved construction means are provided for automatically locking or latching such adjusting means in adjusted position. The locking device preferably takes the form of an impositive locking member which is constantly spring pressed against or towards its seat, a single spring preferably being used to accomplish this purpose, and also to resiliently press the supported part of the brake band away from the brake drum.

An object of the invention is the provision of improved devices for obtaining the effects referred to. Other objects and advantages of the invention will appear more fully hereinafter in the following specification and be particularly pointed out in the appended claims.

In order that the invention may be more clearly understood attention is hereby directed to the accompanying drawings forming part of this application and illustrating by way of example one embodiment of the invention.

In the drawings, Fig. 1 represents a partial vertical section through a wheel and axle provided with a brake drum and an external brake band and illustrating one form of my invention;

Fig. 2 is an enlarged section taken on line 2—2 of Fig. 1;

Fig. 3 is a section taken on line 3—3 of Fig. 2, and

Fig. 4 is a perspective view of a locking plate employed in one form of the construction.

Referring to the drawings, a wheel indicated at 1 is rotatably mounted on the dead axle indicated at 2, the brake drum 3 being secured to the wheel to rotate therewith. A spider 4 is secured to the axle and carries the anchor pin 5. The brake is shown as comprising a casting 6 having a steel band 7 and a lining 8 secured thereto.

The brake casting 6 is provided with a boss 9 having a chamber or opening 10 therein into which anchor pin 5 extends. The portion of the anchor pin within chamber 10 has a threaded opening therethrough through which extends the bolt or headed pin 11. This pin is adapted to bear against the steel band 7 of the brake and accordingly to press it towards the drum 3 about which it extends. When the brake is to be applied, it is tightened about the brake drum by means of devices situated at a point approximately 180° distant from pin 5, about the wheel. Such devices are well known and constitute no part of the present invention and accordingly are not illustrated herein.

In the construction illustrated bolt 11 extends out of chamber 10 through a suitable opening in boss 9 and is provided at its outer end with a head 12 of angular section. A sleeve or housing 13 is positioned about the outer portion of bolt 11, this sleeve having a portion of annular section which extends out through the opening in boss 9 referred to. At its outer end sleeve 13 is shaped to fit head 12, as is indicated at 14. This portion of the sleeve fits closely against the plane faces of head 12 so that sleeve 13 will rotate when the bolt is turned, but slides in and out on the head. Preferably the portion 14 of the sleeve covers the greater portion of the head 12 of the bolt so that when the bolt is adjusted the wrench used will engage portion 14 of the sleeve and turn the latter directly with the bolt.

Sleeve 13 at its inner end is provided with a laterally extending annular flange 15. The outer surface of flange 15 is roughened, preferably by providing the same with radial corrugations. A seating or abutment surface is provided within chamber 10 with which the radial corrugations or flange 15 will coact, when flange 15 is pressed against the same, to prevent rotation of sleeve 13 relative to chamber 10. Preferably a separable metal plate 16 is provided having an opening 17 therethrough, the surface of the plate surrounding the opening being provided with radial corrugations 18. This plate may be detachably positioned within chamber 10, between the flange 15 of sleeve 13 and the adjacent outer wall of boss 9 within which chamber 10 is formed. Opening 17 in plate 6 is of suitable size to permit the main body portion of sleeve 13 being passed therethrough. The seating surface on plate 16, comprising the radial corrugations 18, provides radial depressions which are adapted to fit the radial ribs or corrugations on flange 15, as is indicated in Fig. 3, in which flange 15 is partly broken away to show the corrugations 18 on plate 16 beneath the same. Plate 16 is of proper width to fit between the walls of chamber 10 so that the plate will be nonrotatable within the chamber. Preferably radial corrugations 18¹ are provided on the reverse side of the plate 16, similar to the corrugations 18 so that the plate may interchangeably be dropped in position either side uppermost.

A spiral spring 19 is coiled about bolt 11 in position such that one end of the same will press against anchor pin 5 within chamber 10 and the other end of the same will press against sleeve 13. As is shown in the drawings, sleeve 13 may be provided with an annular shoulder 20 at the point at which the sleeve is shaped to fit the head 12 on bolt 11. With such a construction the spring may extend outwardly in the sleeve until its end comes into engagement with shoulder 20.

With such a construction it is obvious that spring 19 constantly exerts an outwardly directed pressure against the sleeve so as to cause flange 15 of the sleeve to press against the seating surface 18 of flange 16. Accordingly when the bolt has been screwed into an adjusted position spring 19 will press the radial corrugations on flange 15 into engagement with the corresponding depressions on plate 16. Since the plate 16 is not free to rotate within chamber 10, an impositive lock is provided by the construction described, this lock being automatic in operation and serving to prevent bolt 11 from turning or working loose during the vibration to which the parts are subjected in operation. Spring 19 will at the same time serve to press the brake away from drum 3, so that the brake will not bear against the drum when it is not being used.

It will be noted that the corrugated surface 18 on plate 16 constitutes an abutment against which the corrugated or shouldered surface of flange 15 coacts to prevent rotation of sleeve 13 and accordingly to prevent rotation of bolt 11. The radial corrugations 18 may be formed on the wall of chamber 10 about the opening through which the bolt and sleeve extend, if desired, but the provision of a separate plate is preferred, since a simpler and more economical method of manufacture is thereby provided. It should be understood that the invention is not limited strictly to the details of construction described, but that the same is as broad as is indicated by the accompanying claims.

What I claim is:

1. In a brake construction, the combination of a brake drum, a brake, a support therefor, means coacting with said support and brake for adjusting the position of a supported part of said brake with respect to said drum, and automatically acting means tending to lock said adjusting means in any adjusted position.

2. In a brake construction, the combination of a brake drum, a brake, a support therefor, means coacting with said support and brake for adjusting the position of a supported part of said brake with respect to said drum, said means comprising a rotatable member, and one of said elements with which said means coacts having an abutment, a locking device rotatable with said member, and spring means for pressing said locking device into engagement with said abutment in any adjusted position of said member.

3. In a brake construction, the combination of a brake drum, a brake band adapted to coact therewith having an abutment, a support for said band comprising an anchor pin having a threaded opening therethrough, a bolt threaded through said opening and adapted to bear against a portion of said band to adjust the position of the latter towards said drum, and a member rotatable with said bolt and adapted to engage said abutment impositively to hold said bolt in adjusted position.

4. In a brake construction, the combination of a brake drum, a brake band adapted to coact therewith having an abutment, said abutment having shoulders formed thereon, a support for said band comprising an anchor pin having a threaded opening therethrough, a bolt threaded through said opening and adapted to bear against a portion of said band to press the latter towards said drum, a member rotatable with said bolt and adapted to move over the surface of said abutment, and means for pressing said member, in adjusted position, against one of said shoulders on said abutment.

5. In a brake construction, the combination of a brake drum, a brake band adapted to coact therewith having an abutment, said abutment having corrugations thereon, a support for said band comprising an anchor pin having a threaded opening therethrough, a bolt threaded through said opening and adapted to bear against a portion of said band to press the latter towards said drum, a member rotatable with said bolt and adapted to move over the surface of said abutment, said member having corrugations similar to those on said abutment, and spring means acting to press said member against said abutment, to hold said bolt in adjusted position, and also acting to press said band away from said drum.

6. In a brake construction, the combination of a brake drum, a brake adapted to coact therewith, a support for said brake, having a threaded opening therethrough, a pin threaded through said opening and adapted to bear against a portion of said brake to press the latter towards the drum, a sleeve about said pin constructed and positioned to rotate therewith, and having a corrugated flange, said brake having corrugated seating means over which said flange moves when said pin is adjusted, and a spring for pressing said flange against the corrugated surface of said seating means.

7. In a brake construction, the combination of a brake drum, a brake adapted to coact therewith, having a chambered boss, a support for said brake, comprising a member extending into the chamber in said boss and having a threaded opening therethrough, a bolt extending through an opening in said boss into said chamber and threaded through said threaded opening and adapted to bear against a portion of said brake, to press the latter towards said drum, a sleeve about said bolt, extending into said chamber, having a portion fitting about the head of said bolt to rotate therewith and having a corrugated flange within said chamber, said chamber containing a corrugated seating surface over which said flange is adapted to move, and a spring about said bolt, bearing against said support member and said sleeve, to press said flange against said seating surface and to press said brake away from said drum.

8. In a brake construction, the combination of a brake drum, a brake, a support therefor, means coacting with said support and brake for adjusting the gap between the band and drum, and automatically acting means tending to lock said adjusting means in its adjusted positions.

9. In a brake construction, the combination of a brake drum, a brake band adapted to coact therewith, an abutment member carried by said band and nonrotatably arranged with respect thereto, said member having corrugations thereon, a support for said band comprising an anchor pin having a threaded opening therethrough, a bolt threaded through said opening and adapted to bear against a portion of said band to press the latter towards said drum, a member rotatable with said bolt and adapted to move over the corrugated surface of said abutment member, said rotatable member having corrugations similar to those on said abutment member, and spring means acting to press said rotatable member against said abutment member to hold said bolt in adjusted position and also acting to press said band away from said drum.

10. In a brake construction, the combination of a brake drum, a brake adapted to coact therewith, having a chambered boss, a support for said brake, comprising a member extending into the chamber in said boss and having a threaded opening therethrough, a bolt extending through an opening in said boss into said chamber, and threaded through said threaded opening and adapted to bear against a portion of said brake, to press the latter towards said drum, a sleeve about said bolt, extending into said chamber, having a portion fitting about the head of said bolt to rotate therewith and having a corrugated flange within said chamber, a separable plate positioned within said chamber between said corrugated flange and the outer wall of said chamber, said plate having an opening therein through which said sleeve extends with a corrugated surface extending radially about said opening, said plate being nonrotatably fitted between the walls of said chamber, and a spring about said bolt, bearing against said support member and said sleeve, to press said flange against the corrugated seating surface of said plate and to press said brake away from said drum.

In testimony whereof I have signed my name to this specification this 28th day of October, 1922, at New York, N. Y.

GUSTAV W. CARLSON.